United States Patent
Zhu et al.

(10) Patent No.: US 11,252,622 B2
(45) Date of Patent: Feb. 15, 2022

(54) NETWORK CONGESTION MANAGEMENT SERVICE

(71) Applicant: Verizon Patent and Licensing Inc., Arlington, VA (US)

(72) Inventors: Lily Zhu, Parsippany, NJ (US); Andrew E. Youtz, Princeton, NJ (US); Christopher M. Schmidt, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1335 days.

(21) Appl. No.: 14/582,299

(22) Filed: Dec. 24, 2014

(65) Prior Publication Data

US 2016/0192257 A1    Jun. 30, 2016

(51) Int. Cl.
*H04W 36/14* (2009.01)
*H04W 36/22* (2009.01)
*H04W 48/12* (2009.01)

(52) U.S. Cl.
CPC .......... *H04W 36/14* (2013.01); *H04W 36/22* (2013.01); *H04W 48/12* (2013.01)

(58) Field of Classification Search
CPC . H04W 28/02; H04W 28/0289; H04W 36/14; H04W 36/22; H04W 48/12
See application file for complete search history.

(56) References Cited

U.S. PATENT DOCUMENTS

| | | | | |
|---|---|---|---|---|
| 2008/0265133 A1* | 10/2008 | Sawtell | ............. | H02M 3/33569 250/206 |
| 2009/0232143 A1* | 9/2009 | Li | ..................... | H04W 72/1242 370/395.3 |
| 2010/0007053 A1* | 1/2010 | Yamaguchi | ........... | B30B 11/005 264/299 |
| 2012/0063493 A1* | 3/2012 | Hasegawa | ............. | H04L 47/263 375/211 |
| 2013/0242965 A1* | 9/2013 | Horn | ..................... | H04W 24/10 370/338 |
| 2014/0133294 A1* | 5/2014 | Horn | ................. | H04W 28/0247 370/230 |
| 2014/0198639 A1* | 7/2014 | Jokinen | ............. | H04W 28/0289 370/230 |
| 2014/0219089 A1* | 8/2014 | Ericson | ............... | H04W 76/046 370/232 |
| 2014/0378155 A1* | 12/2014 | Yu | ..................... | H04W 28/0205 455/452.1 |

(Continued)

*Primary Examiner* — Un C Cho
*Assistant Examiner* — Kenan Cehic

(57) ABSTRACT

A method, a device, and a non-transitory storage medium having instructions to attach to a user device, wherein the network device provides wireless access coverage in a cell area or a sector area of a first network; detect whether the network device is in a congested state; generate a message that indicates that the network device is in the congested state when the network device is in the congested state; and transmit the message on a control or signaling channel for receipt by user devices attached to the network device in the cell area or the sector area. The user device scans the control or signaling channel before initiating a session and determines whether the network device is in the congested state. When the network device is in the congested state, the user device performs a switchover to a second network. The user device has multimode capabilities.

20 Claims, 8 Drawing Sheets

(56) References Cited

U.S. PATENT DOCUMENTS

2016/0212653 A1* 7/2016 Wang ................ A61B 10/0051
2016/0242111 A1* 8/2016 Wakabayashi ........ H04W 48/16
2016/0381594 A1* 12/2016 Tomici ................ H04L 45/123
  370/236

* cited by examiner

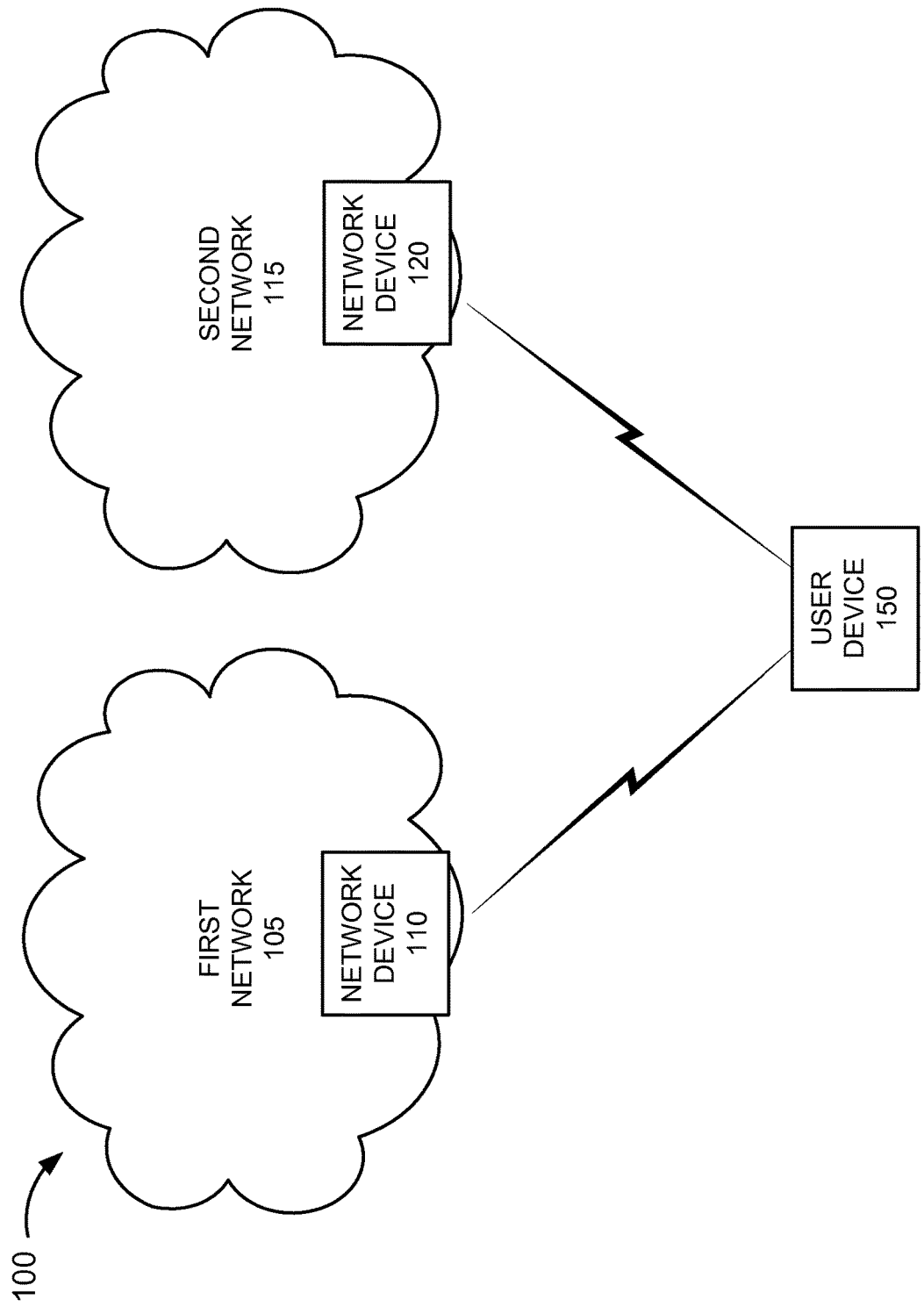

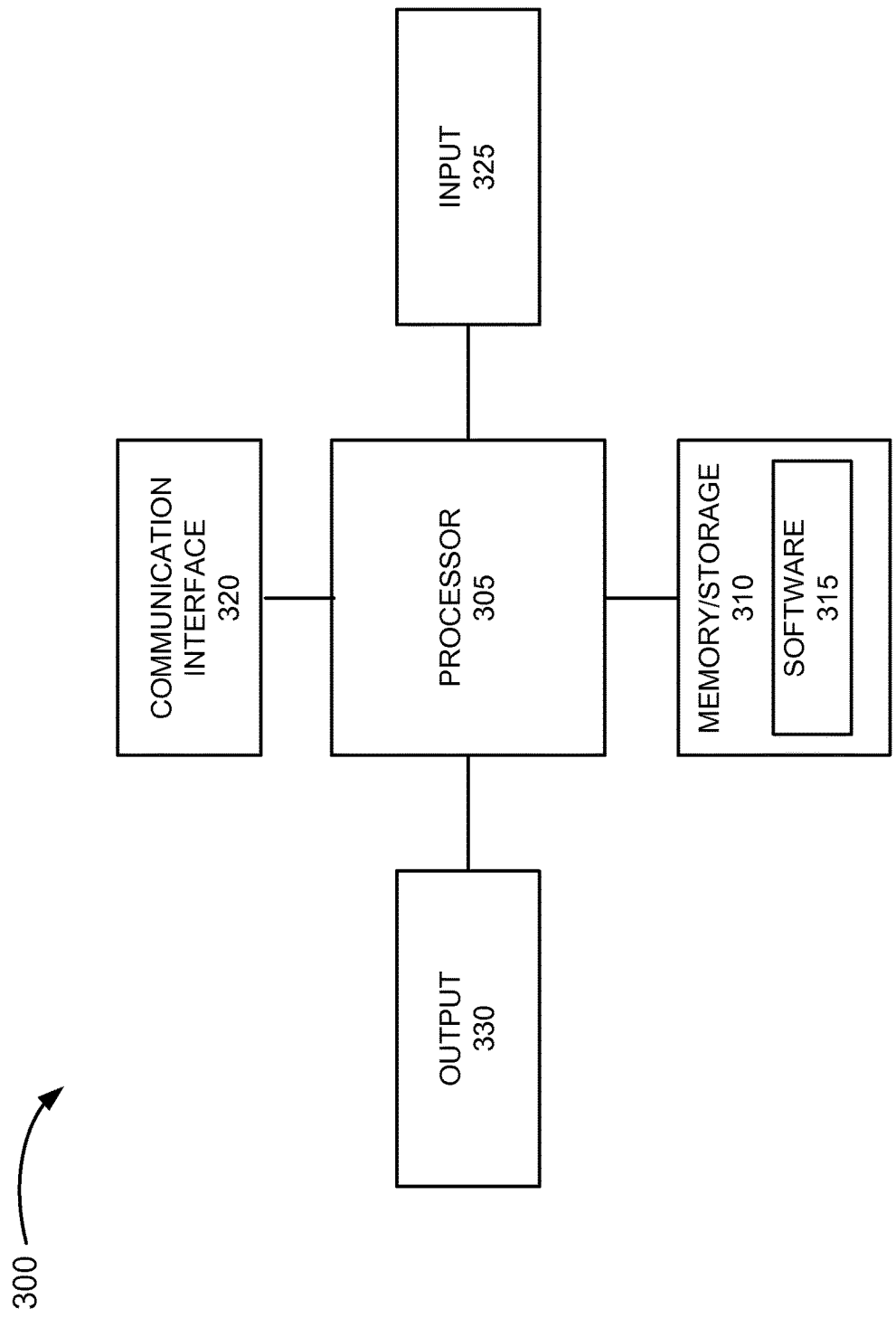

ABSTRACT

NETWORK CONGESTION MANAGEMENT SERVICE

BACKGROUND

Due to resource limitations, a wireless node, such as a base station, can experience congestion. For example, when the network load is such that network resource limitations cannot be relieved for an extended period of time, a congested state is reached. However, since the coverage of the radio access technology (e.g., Long Term Evolution (LTE) is still good, a mobile device won't search for another RAT to obtain service. As a result, a mobile device that is attached to the base station may not be able to obtain service. For critical, real-time services, there should be a way for a multi-RAT user device to find a service in the underlying radio access network for alternative services.

BRIEF DESCRIPTION OF THE DRAWINGS

FIG. 1 is a diagram illustrating an exemplary environment in which exemplary embodiments of a network congestion management service may be implemented;

FIG. 3 is a diagram illustrating exemplary components of a device that may correspond to one or more of the devices in the exemplary environment.

DETAILED DESCRIPTION OF PREFERRED EMBODIMENTS

Figure 2A:
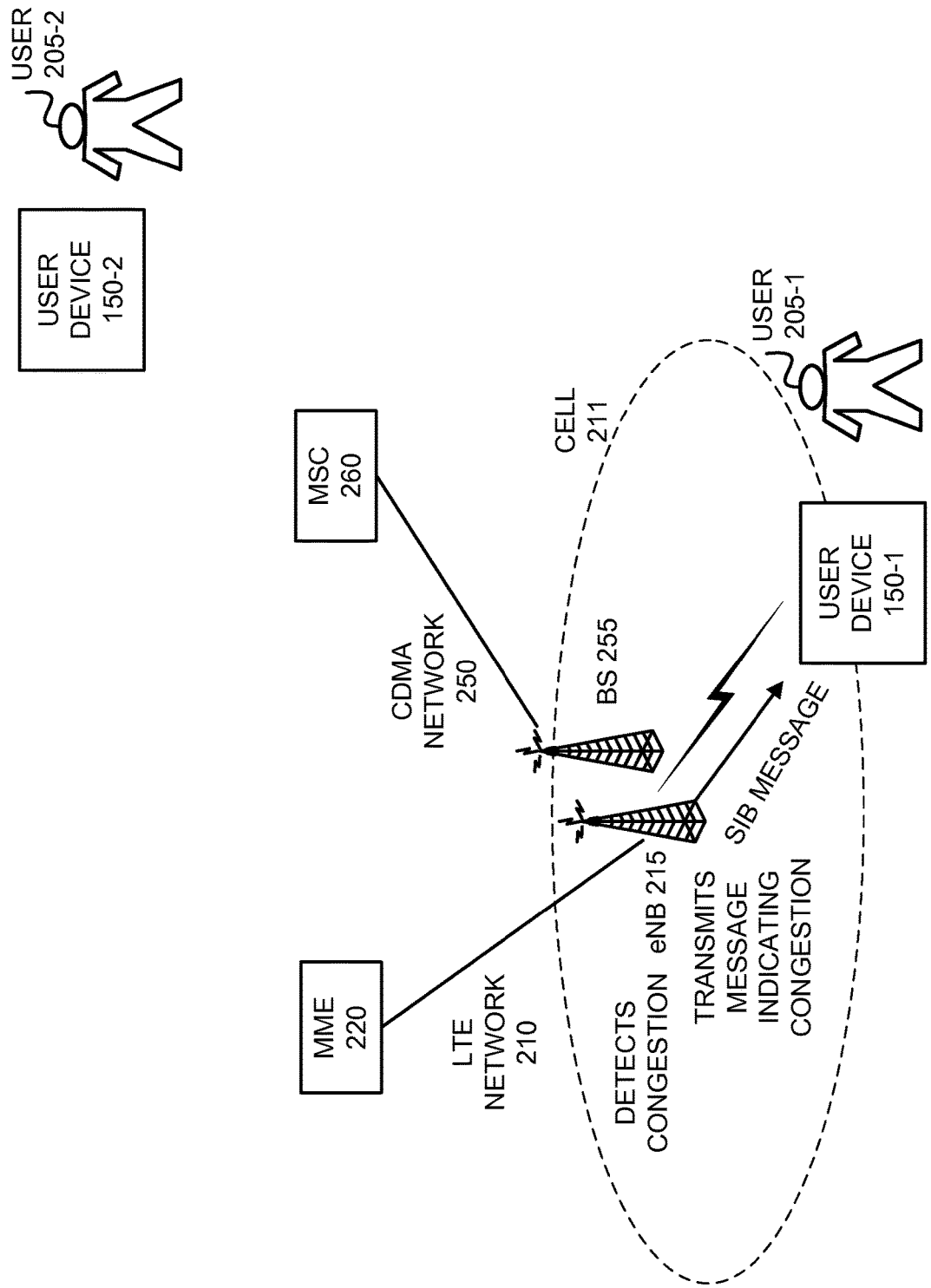
FIGS. 2A-2D are diagrams that illustrate exemplary processes pertaining to the network congestion management service.

The following detailed description refers to the accompanying drawings. The same reference numbers in different drawings may identify the same or similar elements. Also, the following detailed description does not limit the invention.

A network may enter a congested state due to resource limitations. For example, in a wireless network, a base station may have certain resource limitations to provide a service. During this time, a mobile device, which is attached to the base station, may not be able to use the base station for service. For example, the mobile device may not be able to place a telephone call via the base station since the base station is in the congested state.

However, a wireless user device, such as a mobile device, may include multiple, wireless communication interfaces that allow the wireless user device to communicate via different technological standards. For example, the wireless user device may have Long Term Evolution (LTE) and Code Division Multiple Access (CDMA) capabilities. Unfortunately, when the base station, such as an evolved Node B (eNB) of the LTE standard, is in a prolonged congested state, the wireless user device does not have information pertaining to the congested state of the eNB and continues to access LTE for a service, since the LTE system shows a very strong coverage (e.g., based on radio link measurement), which may lead to a failure in service. For example, the wireless user device may be denied or blocked from placing a telephone call via the eNB. While the wireless user device may attempt to subsequently place the telephone call via a base station of the CDMA standard due to LTE call origination failure, the user will experience delay before the telephone call can be established. However, a better approach may be for the wireless user device to try the service directly in CDMA without first experiencing a failure by the LTE system.

According to an exemplary embodiment, a wireless node determines when the wireless node is in a congested state. Based on such a determination, according to an exemplary embodiment, the wireless node broadcasts a message that carries information indicating that the wireless node is in the congested state. For example, the wireless node may broadcast the message periodically via a signaling channel or a control channel. According to an exemplary embodiment, the wireless node broadcasts a message that carries information indicating that the wireless node is not in the congested state. That is, the message indicates that a service is available via the wireless node. In this way, the wireless node may toggle between broadcast messages based on the state of the wireless node (i.e., congested or non-congested). According to another embodiment, the wireless node does not broadcast a message that carries information indicating that the wireless node is not in the congested state or changes the content of the same message to indicate a non-congested state.

According to an exemplary embodiment, the wireless user device monitors for a message before invoking a particular service. For example, assume a user of a wireless user device decides to place a telephone call and provides an input, via the wireless user device, to initiate the telephone call. In response, the wireless user device monitors or scans a channel to determine whether the base station is in the congested state for this type of service. For example, the wireless user device may receive a broadcast message, via the channel, indicating that the wireless node is or is not in a congested state for a type of service. According to this example, assume that the wireless user device receives the broadcast message that indicates that the wireless node is in the congested state. According to an exemplary embodiment, based on the receipt of the message, the wireless user device switches from one wireless communication interface used to communicate with the congested base station, to another wireless communication interface. For example, assume the base station is an eNB of an LTE network. The wireless user device switches from an LTE communication interface to another communication interface (e.g., a CDMA communication interface) to place the telephone call. In this way, a call set-up failure with the congested eNB is avoided.

In view of foregoing, quality of service issues stemming from congestion may be minimized. Additionally, in contrast to "network-wide" congestion control mechanisms, the congestion control management service may be implemented at a cell or a sector level (e.g., a portion of a cell), which in turn provides a more granular level of congestion control. Also, in contrast to other congestion control mechanisms that require the wireless user device to perform special operations so as to evaluate and guess the state of the network, the congestion control management service (e.g., using existing service-specific access barring in System Information Block (SIB) type 2 for LTE, and extend user equipment (UE) behavior to its RRC connected mode in addition to RRC idle mode) provides a more definitive solution for managing congestion by transmitting a message indicating its current state.

FIG. 1 is a diagram illustrating an exemplary environment 100 in which exemplary embodiments of a network congestion management service may be implemented. As illustrated, environment 100 includes a first network 105, which includes a network device 110, and a second network 115, which includes a network device 120. As further illustrated, environment 100 includes a user device 150.

Environment 100 may be implemented to include wireless connections between user device 150 and networks 105 and 115. A connection may be direct or indirect and may involve an intermediary device and/or an intermediary network not illustrated in FIG. 1. Additionally, the number and the arrangement of connections between user device 150 and networks 105 and 115 are exemplary.

A device may be implemented according to one or multiple network architectures (e.g., a client device, a server device, a peer device, a proxy device, and/or a cloud device). Also, according to other embodiments, one or more functions and/or processes described as being performed by a particular device may be performed by a different device, or some combination of devices. First network 105 and second network 115 may share a common service provider. Alternatively, first network 105 and second network 115 may each be associated with different service providers.

First network 105 includes a wireless network that provides access to a service or an asset. First network 105 may be implemented using various wireless architectures and/or technologies, such as a cellular network, a 3rd Generation (3G) network, a 4th Generation (4G) network, etc. By way of further example, first network 105 may be implemented to include an LTE network, a Universal Mobile Telecommunications System (UMTS) network, a Global System for Mobile Communications (GSM) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Evolution Data Optimized (EV-DO) network, and/or another type of wireless network (e.g., an LTE Advanced network, or future generation wireless network architecture).

Given the wide variety of wireless networks that may be implemented in various embodiments, first network 105 may include various types of network devices 110, such as a base station, a base station controller, an eNB, a serving gateway (SGW), a packet data network gateway (PGW), a mobility management entity (MME), a home node B, a wireless relay node, a pico base station, a base transceiver station, a repeater, a user device gateway, a radio node, an anchor point, a wireless router, a gateway, etc. A network device may support one or multiple access and/or wireless technologies. First network 105 may include other network devices that pertain to billing, security (e.g., a firewall, an authentication device, etc.), providing a service or an asset, providing access to another network, etc.

According to an exemplary embodiment, a network device 110 of first network 105 determines when network device 110 is in a congested state. For example, network device 110 may use conventional or well-known techniques to determine a state of congestion. According to an exemplary embodiment, when network device 110 determines that it is in a congested state, network device 110 generates and transmits a message that carries information indicating that network device 110 is in the congested state. According to an exemplary embodiment, network device 110 broadcasts the messages for receipt by user device 150. For example, network device 110 broadcasts the message periodically during a time period network device 110 is in the congested state. According to an exemplary embodiment, network device 110 broadcasts the message on a signaling channel or a control channel.

According to an exemplary embodiment, when network device 110 determines that it is no longer in a congested state, network device 110 generates and transmits a message that carries information indicating that network device 110 is not in a congested state. Network device 110 may periodically broadcast the message on a signaling channel or a control channel. Alternatively, when network device 110 determines that it is no longer in a congested state, network device 110 may take no further action. According to such an embodiment, when user device 150 monitors or scans the signaling channel or the control channel and determines that no message is to be received, user device 150 determines that network device 110 is not in a congested state.

According to an exemplary embodiment, network device 110 is an wireless access node to first network. For example, network device 110 may be implemented as a base station. By way of further example, network device 110 may be implemented as an eNB, a Node B, a base transceiver station, a microcell wireless node, a picocell wireless node, or a femtocell wireless node. Alternatively, network device 110 may be implemented as a gateway device or an access point that may act as an entry point to first network 105 in a particular cell or sector. In this way, the network congestion management service may provide a finer granularity of congestion control compared to other network-wide or larger geo-based areas of congestion control.

Second network 115 includes a wireless network that provides access to a service or an asset. Similar to first network 105, second network 115 may be implemented using various wireless architectures and/or technologies and includes various types of network devices. Network device 120 is a device similar to network device 110. According to an exemplary embodiment, network device 110 and network device 120 may be combined into a single device having distinct logic and communication interfaces.

According to an exemplary embodiment, first network 105 and second network 115 include different types of wireless access technologies. For example, first network 105 may include an LTE network and second network 115 may include a wireless network other than an LTE network. Additionally, although environment 100 illustrates two networks (i.e., first network 105 and second network 115), according to other embodiments, environment 100 may include an additional network (e.g., a third network, a fourth network, etc.). The additional network may be of a third type or may be of a type that is redundant relative to first network 105 or second network 115. The use of a third network, a fourth network, etc., may rest on the multimode capabilities of user device 150.

User device 150 includes a device with wireless communicative capabilities. User device 150 may be a mobile device. For example, user device 150 may be implemented as a smartphone, a tablet device, a netbook, a vehicular communication system within a vehicle, a computer, a smart television, or some other type of suitable wireless communicative device. According to other embodiments, user device 150 may be a non-mobile device. For example, user device 150 may be implemented as a kiosk, a vending machine, a meter device associated with providing a utility (e.g., gas, electric, etc.) or other type of smart device (e.g., a sensor device, etc.). In this regard, user device 150 may operate with or without an end user. Additionally, user device 150 may operate to provide machine-to-machine communications, user-to-user communications, etc.

According to an exemplary embodiment, user device 150 is capable of connecting to first network 105 and to second network 115. For example, user device 150 includes multiple communication interfaces. The communication interfaces operate according to at least two different communication standards. Depending on the multimode capabilities of user device 150, user device 150 may operate in a single mode at one time or may operate in multiple modes simultaneously. The operation of user device 150 in the single mode may or may not include the scanning or monitoring of another mode/wireless technology. An exemplary implementation of the network congestion management service is described further below.

FIGS. 2A-2D are diagrams illustrating an exemplary implementation of an exemplary embodiment of the network congestion management service. Referring to FIG. 2A, an LTE network 210 includes an eNB 215 and an MME 220. A CDMA network 250 includes a base station 255 and a mobile switching center 260. It may be assumed, although not illustrated, that other network elements (e.g., a packet data network gateway (PGW), a base station controller, etc.) exist in LTE network 210 and CDMA 250, respectively, but have been omitted for purposes of brevity. A cell 211 indicates a geographic area serviced by eNB 215 and BS 255. As illustrated, eNB 215 and base station 255 resides within cell 211. In this regard, eNB 215 and BS 255 may be considered co-located. A user device 150-1 associated with a user 205-1 may communicate with a user device 150-2 associated with a user 205-2 via LTE network 210 or CDMA network 250. It may be assumed that user device 150-1 has multimode capabilities that include LTE and CDMA wireless technologies. Additionally, although not illustrated, an intermediary network element, a network, etc., may exist between MME 220 and user device 150-2 and/or between a mobile switching center (MSC) 260 and user device 150-2. According to this exemplary scenario, assume user device 150-1 attaches to LTE network 210 via eNB 215. Although not illustrated, user device 150-1 may register with CDMA network 250 via BS 255.

According to an exemplary implementation, eNB 215 is configured to detect when a congested state occurs. For example, eNB 215 may evaluate current load measurements relative to available resources. The loading measurements may be application-specific, service-specific, or may be an overall loading measurement. By way of further example, eNB 215 may monitor a total number of bearers, a total bit rate, or other types of parameters (e.g., Quality of Service (QoS), Quality Control Indicator (QCI), etc.) that indicate or provide a basis for declaring a congested state. According to this example, assume that eNB 215 determines that it is in a congested state.

As illustrated in FIG. 2A, eNB 215 generates and transmits a message that carries information indicating that it is in the congested state. For example, eNB 215 broadcasts a System Information Block (SIB) message. The SIB message may be a type 2 message and includes a service-specific access class (SSAC) barring parameter. The SSAC barring parameter may apply to cell 211 or a portion of cell 211 (e.g., a sector). Additionally, or alternatively, the SSAC barring parameter may be application-specific. Alternatively, for example, eNB 215 may broadcast a bit, which indicates a congested state, using any suitable message. As previously described, for example, the message is broadcasted using a control channel or a signaling channel. Additionally, as previously described, eNB 215 periodically broadcasts the message while in the congested state or at least as long as possible while in the congested state (e.g., assuming congestion does not negate such a transmission on the control channel or the signaling channel).

Figure 2B:
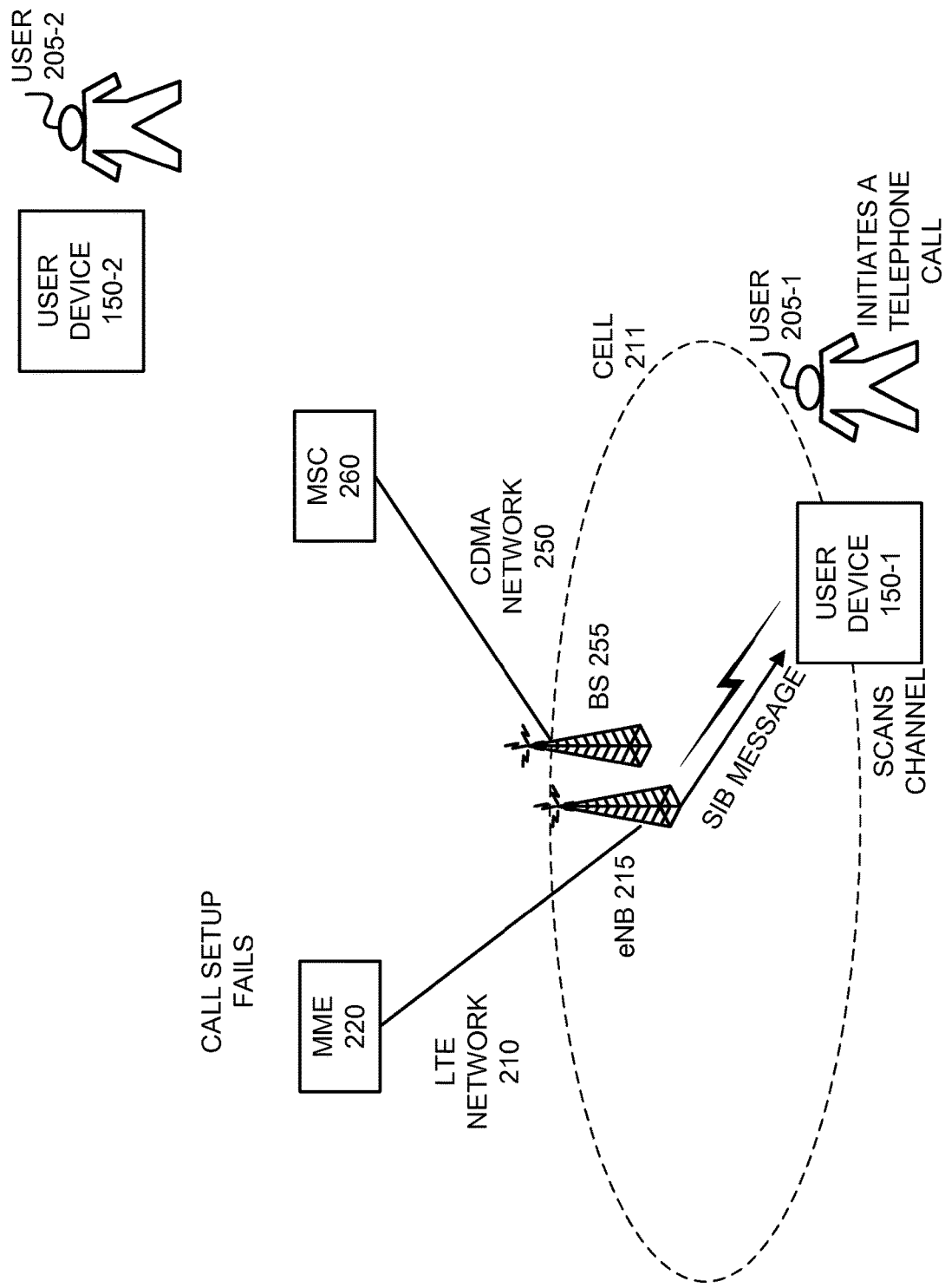

Referring to FIG. 2B, assume user 205-1 wishes to place a telephone call to user 205-2 via LTE network 210. Although not illustrated, it may be assumed that user device 205-2 is connected to a network capable of communicating with user device 205-1 via CDMA network 250 and LTE network 210. Upon receiving an input to initiate the telephone call (or other type of service), user device 150-1 scans the control channel or the signaling channel that is used for broadcasting the SIB message or other type of message that may carry congestion state information. Upon scanning the channel, user device 150-1 receives the SIB message or other type of message and determines that eNB 215 is currently in a congested state and unable to service the telephone call. According to other implementations, user device 150-1 may scan the control channel or the signaling channel without an application or a service being initiated. For example, user device 150-1 may scan the control channel or the signaling channel periodically, etc.

Figure 2C:
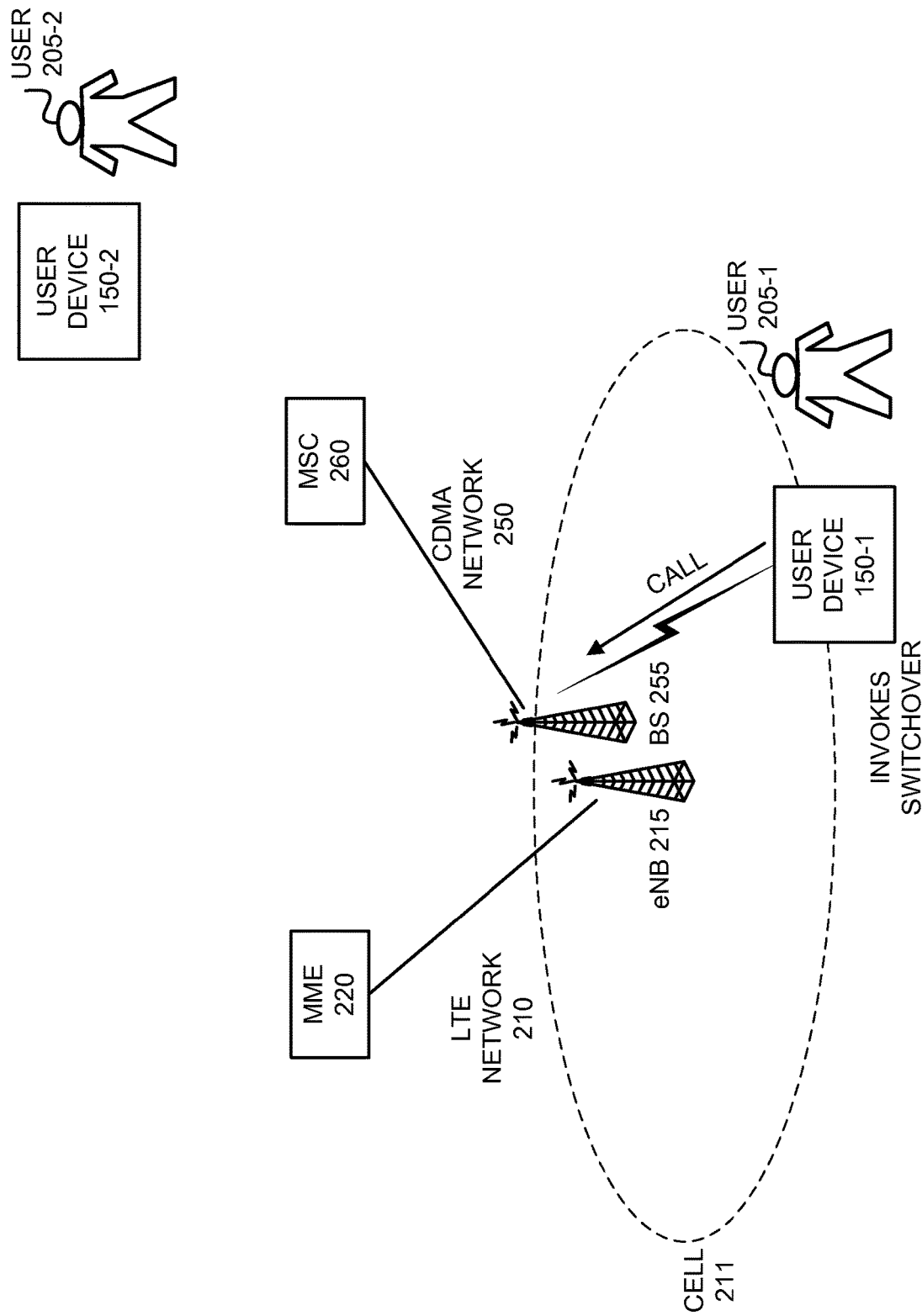

Referring to FIG. 2C, in response to determining that eNB 215 is in the congested state, user device 150-1 automatically invokes a switchover process, which is a part of the network congestion management service. The switchover process causes user device 150-1 to place the telephone call via BS 255 of CDMA network 250. For example, user device 150-1 uses its multimode capabilities and switches from the communication interface that supports the LTE standard to another communication interface that supports the CDMA standard so as to establish the session. According to this example, assume that user device 150-1 establishes a connection with BS 255 of CDMA network 250 and successfully establishes a telephone call with user 205-2 via user device 150-2.

Figure 2D:
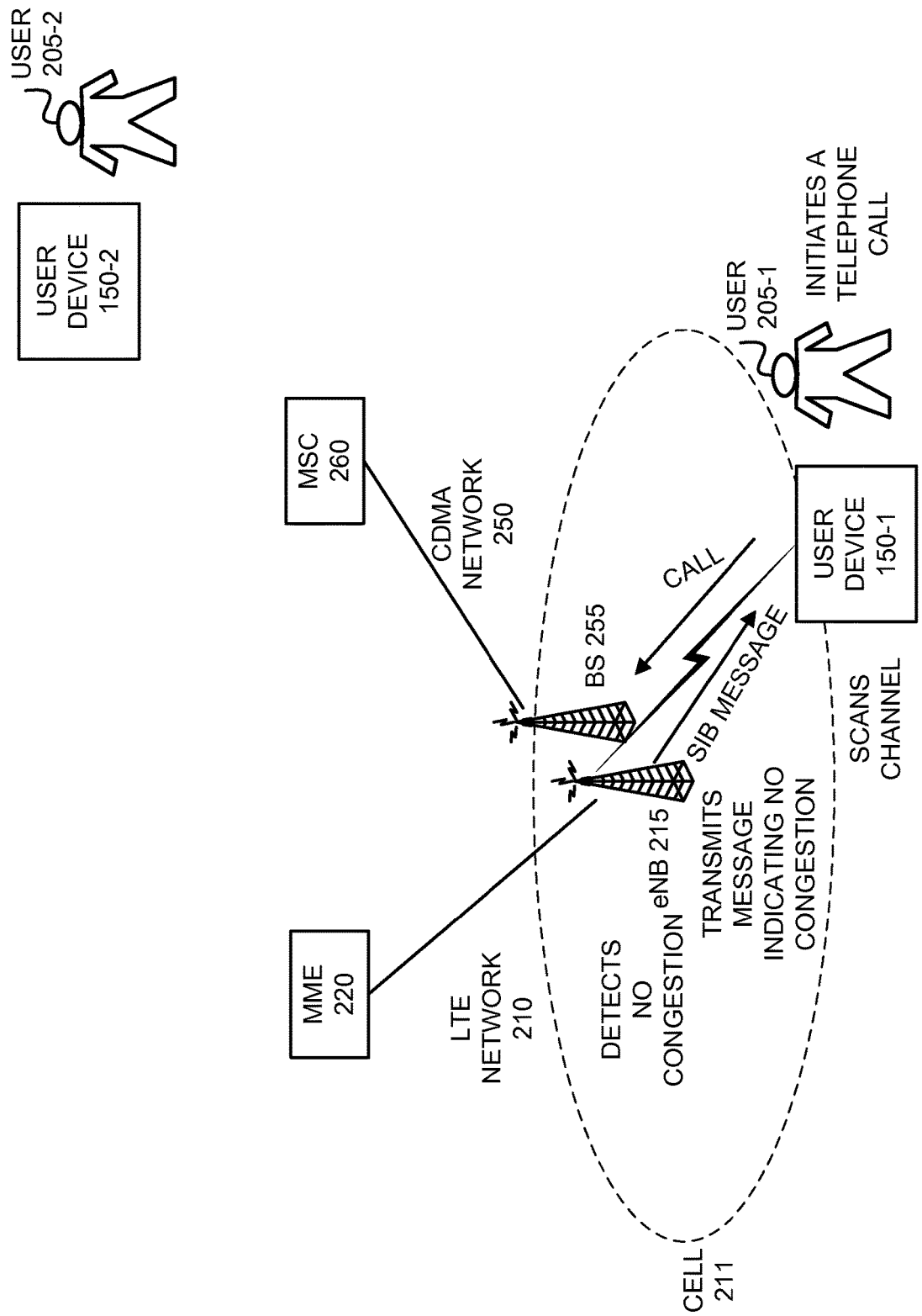

Referring to FIG. 2D, assume that the congested state of eNB 215 ends during which eNB 215 detects that there is no longer any congestion. Based on such a determination, eNB 215 generates and transmits a SIB message or other type of message that indicates there is no congestion. The SIB message or other type of message may be application-specific. According to another exemplary implementation, when eNB 215 detects that there is no longer any congestion, eNB 215 does not broadcast any message indicating that congestion has been relieved. However, according to this example, assume that eNB 215 broadcasts a message. Thereafter, assume user 205-1 initiates another call to user 205-2. Also, assume that user device 150-1 has already switched back to LTE network 210 based on a preferred technology setting. In a manner similar to that previously described, user device 150-1 scans the control channel or the signaling channel that is used for broadcasting the SIB message or other type of message that carries congestion state information. Upon scanning the channel, user device 150-1 receives the SIB message or other type of message and determines that eNB 215 is not in a congested state and is able to service the telephone call. Based on this determination, user device 150-1 places the call via eNB 215 of LTE network 210.

Although the above scenarios have been explained with respect to particular networks (e.g., LTE and CDMA), message (e.g., SIB type 2), and application (e.g., telephone call), according to other implementations, the network congestion management service may be applied to different types of networks, messages, and applications. Additionally, for example, according to other implementations, the congestion state information may be transmitted via a proprietary message or via some other suitable message and/or field of a message. Additionally, or alternatively, a user may initiate a web session (e.g., streaming of a movie, etc.) or some other type of network session that causes user device 150 to invoke the switchover process based on receiving a message indicating a congested state, as described herein.

As previously described, user device 150 includes multiple wireless communication interfaces. User device 150 may operate in a single mode or a dual mode. According to other scenarios, congestion may occur during a session (e.g., a telephone call or another type of session pertaining to a service or an application). During such a scenario, user device 150 may be configured to scan the channel and initiate a switchover process in a manner similar to that previously described. This may depend on whether the network and user device 150 both support service continuity via a seamless handover or not. Thus, according to one implementation, a handover from one technology (e.g., LTE) to another (e.g., CDMA) may be initiated assuming both user device 150 and network device 110 (e.g., eNB 215) support this. Alternatively, according to another implementation, user device 150 may continue with the session as long as possible. When the session ends, whether prematurely or not, user device 150 may initiate the switchover process.

FIG. 3 is a diagram illustrating exemplary components of a device 300 that may correspond to one or more of the devices in the environments described herein. For example, device 300 may correspond to network devices of first network 105 and second network 115, user device 150, as well as other network devices described. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to user device 150, software 315 may include an application that, when executed by processor 315, provides the network congestion management service, as described herein. Additionally, with respect to network device 110 (e.g., eNB 215, etc.), software 315 may include an application that, when executed by processor 315, provides the network congestion management service, as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard. As previously described, according to an exemplary embodiment, user device 150 includes multiple communication interfaces 320. The multiple communication interfaces 320 support multiple wireless technologies.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4A:
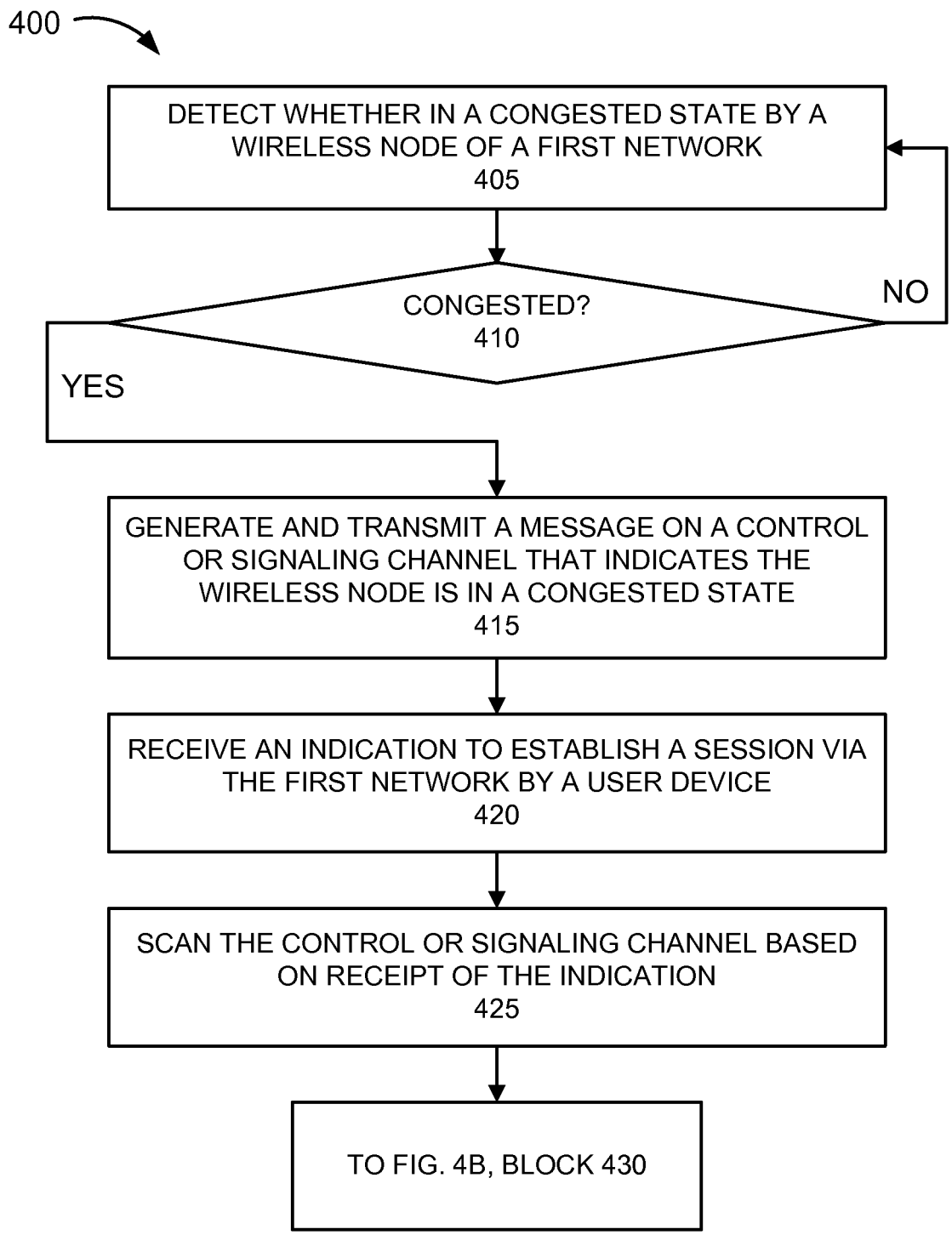
FIGS. 4A and 4B are flow diagrams that illustrate an exemplary process pertaining to the network congestion management service.
Figure 4B:
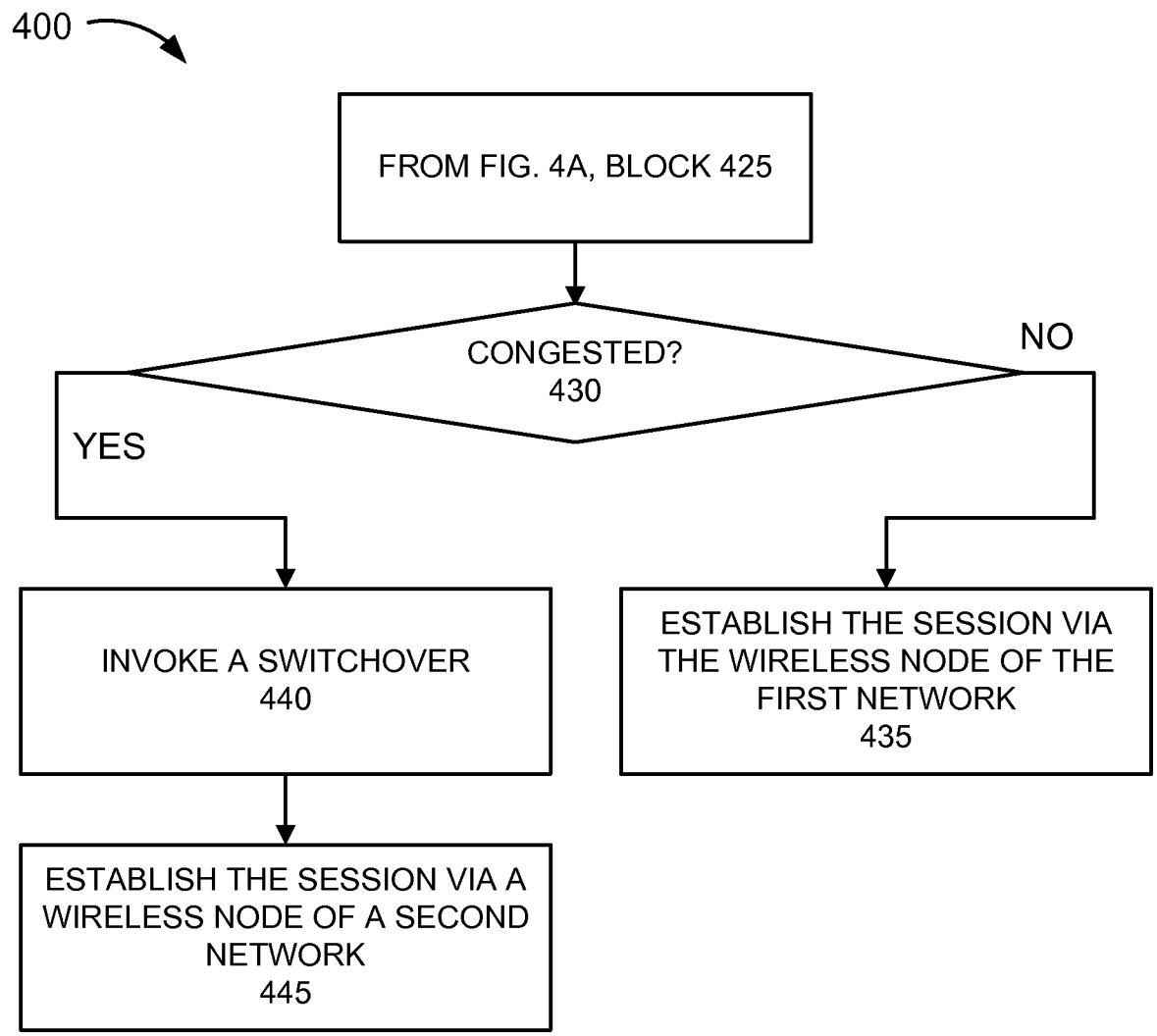

FIGS. 4A and 4B are flow diagrams illustrating an exemplary process 400 pertaining to the network congestion management service. Process 400 is directed to a process previously described above with respect to FIGS. 1, 2A-2D and elsewhere in this description, in which a wireless node detects when it is congested, and provides congestion state information to a user device. The user device performs a switchover process when the user device wants to establish a session via the wireless node and the wireless node is in the congested state. According to an exemplary embodiment, the wireless node (e.g., a base station, etc.) performs some of the steps described in process 400. Additionally, the user device is a multimode device and performs some of the steps described in process 400. For example, processor 305 may execute software 315 to perform the steps described in process 400.

Referring to FIG. 4A, process 400 may begin with detecting whether a wireless node of a first network is in a congested state (block 405). For example, a wireless node (e.g., network device 110, eNB 215) of a first network (e.g., first network 105, LTE network 210) detects whether the wireless node is in a congested state. For example, as previously described, the wireless node evaluates current load measurements relative to available resources. The load measurements may be application-specific or may be an overall load measurement.

In block 410, when it is determined that the wireless node is not in a congested state (block 410-NO), the process 400 returns to block 405. That is, according to this example, the wireless node does not broadcast a message indicating it is not in a congested state. Rather, the wireless node takes no further action other than to continue to monitor its state for congestion.

When it is determined that the wireless node is in a congested state (block 410—YES), a message is generated and transmitted on a control or a signaling channel that indicates the wireless node is in a congested state (block 415). For example, the wireless node generates a message that carries information indicating that the wireless node is in a congested state. Depending on the wireless standard of the first network, the congestion state information may be carried in various types of messages (e.g., a SIB message, a proprietary message, etc.). The congestion state information may be application-specific or not, may be implemented as a single bit or not, etc. As previously described, the message may be transmitted on a control or a signaling channel. Additionally, the message may be periodically broadcasted within a cell or a sector of a cell during the time the wireless node is in the congested state or as long as possible (e.g., assuming congestion does not negate such a transmission on the control or the signaling channel).

For purposes of description, assume that user device 150 is attached to first network 105 and registers and/or is also attached to second network 115.

In block 420, an indication to establish a session via the first network is received. For example, user device 150 may attempt to establish a session (e.g., a data session, a voice session, a web session, a streaming session, etc.) with another device (e.g., a user device, a network device). By way of further example, a user may launch an application or provide some input to initiate a session. Alternatively, in a machine-to-machine context, user device 150 may be configured with a trigger to automatically initiate a session. For example, when user device 150 is a sensor device or a meter device, user device 150 may be configured with a trigger to upload data. In this regard, user device 150 receives an indication that a session is to be established.

In block 425, the control channel or the signaling channel is scanned based on receipt of the indication. For example, user device 150 scans the control channel or the signaling channel before attempting to establish the session via the wireless node of the first network.

Referring to FIG. 4B, in block 430, it is determined whether the wireless node is in a congested state. For example, user device 150 determines whether the wireless node is in the congested state based on scanning the control channel or the signaling channel and interpreting the congestion state information carried in the message. As previously described, according to an exemplary embodiment, the wireless node transmits a message that carries congestion state information indicating whether the wireless node is in a congested state. User device 150 is able to determine the state of the wireless node based on receiving the message.

According to other embodiments, the wireless node may not transmit a message when the wireless node is not in the congested state. According to such an embodiment, user device 150 is able to determine that the wireless node is not in the congested state by virtue of scanning the control channel or the signaling channel and determining that no message is being broadcasted.

When it is determined that the wireless node is not in the congested state (block 430—NO), user device 150 establishes the session via the wireless node of the first network (block 435). For example, user device 150 establishes a data session, a voice session, a web session, or a streaming session.

When it is determined that the wireless node is in the congested state (block 430—YES), user device 150 invokes a switchover process (block 440). For example, user device 150 uses its multimode capabilities and switches communication interfaces to establish the session via another wireless node of a second network.

In block 445, the session is established via the other wireless node of the second network. For example, user device 150 establishes a data session, a voice session, a web session, or a streaming session via the other wireless node (e.g., network device 120, base station 255) of the second network (e.g., second network 115, CDMA network 250).

Although FIGS. 4A and 4B illustrate an exemplary network congestion management process 400, according to other embodiments, process 400 may include additional operations, fewer operations, and/or different operations than those illustrated in FIGS. 4A and 4B, and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:
   attaching, by a wireless node of a first network, to a user device, wherein the wireless node provides wireless access coverage in a cell area or a sector area;
   detecting, by the wireless node subsequent to the attaching, whether the wireless node is in a congested state, wherein the congested state is a state that prevents any access to a type of service in the cell area or the sector area, and wherein the detecting comprises:
      evaluating current load measurements relative to available resources, wherein the load measurements are application-specific;
   generating, by the wireless node, a message that indicates that the wireless node is in the congested state based on detecting that the wireless node is in the congested state;
   transmitting, by the wireless node based on the generating, the message on a control channel or a signaling channel of the first network for receipt by one or more user devices attached to the wireless node in the cell area or the sector area;
   detecting, by the wireless node subsequent to the transmitting, that the wireless node is no longer in the congested state; and
   omitting, by the wireless node in response to detecting that the wireless node is no longer in the congested state, to retransmit the message and omitting to transmit any other message, via the control channel or the signaling channel, indicating that the wireless node is in a lesser degree of congestion relative to the congested state.

2. The method of claim 1, further comprising:
   receiving, by the user device, an indication to initiate a session with another device via the wireless node of the first network, wherein the user device is a multimode device capable of accessing, via a first communication interface, the first network of a first communicative standard and accessing, via a second communication interface, a second network of a second communicative standard that is different from the first communicative standard;
   receiving, by the user device via the first communication interface, the message on the control channel or the signaling channel;
   determining, by the user device, whether the wireless node is in the congested state based on receiving the message; and
   invoking, by the user device, a switchover, wherein the switchover includes establishing a same session via the second communication interface and another wireless node of the second network, in response to determining that the wireless node of the first network is in the congested state.

3. The method of claim 2, wherein the session and the same session are one of a voice session, a data session, a web session, or a streaming session.

4. The method of claim 1, wherein the first network is a Long Term Evolution (LTE) network and the wireless node is an evolved Node B, and the method further comprising:
   receiving, by the user device and subsequent to a receipt of the message, an indication to initiate a session with another device via the wireless node of the first network, wherein the user device is a multimode device capable of accessing, via a first communication interface, the first network of a first communicative standard and accessing, via a second communication interface, a second network of a second communicative standard that is different from the first communicative standard;
   scanning, by the user device, the control channel or the signaling channel based on receiving the indication;
   determining, by the user device, whether the wireless node is in the congested state based on the scanning; and
   omitting to invoke, by the user device, a switchover, wherein the switchover includes establishing a same session via the second communication interface and another wireless node of the second network, in response to determining that the wireless node of the first network is not in the congested state, wherein a determination that the wireless node is not in the congested state is based on not receiving the message on the control channel or the signaling channel.

5. The method of claim 4, wherein the message includes a system information block message that includes a service-specific access class (SSAC) barring parameter.

6. The method of claim 1, wherein the transmitting further comprises:
   periodically transmitting the message during a time period that the wireless node is in the congested state, wherein the transmitting includes broadcasting the message in the cell area or the sector area.

7. The method of claim 1, further comprising:
   performing, by the wireless node subsequent to the attaching, a session of the type of service with the user device, and wherein the detecting further comprises:
   detecting, by the wireless node during the performing, whether the wireless node is in the congested state.

8. The method of claim 7, further comprising:
   performing, by the wireless node, a handover with another wireless node of a second network and the user device based on detecting that the wireless node is in the congested state.

9. A system comprising:
   a network device, wherein the network device comprises:
      a communication interface;
      a first memory, wherein the first memory stores first instructions; and a first processor, wherein the first processor executes the first instructions to:
    attach to a user device, wherein the network device provides wireless access coverage in a cell area or a sector area of a first network;
    detect, subsequent to the attachment, whether the network device is in a congested state, wherein the congested state is a state that prevents any access to a type of service in the cell area or the sector area, and wherein, when detecting, the first processor executes the first instructions to:
        evaluate current load measurements relative to available resources, wherein the load measurements are application-specific;
        generate a message that indicates that the network device is in the congested state based on a detection that the network device is in the congested state;
    transmit, via the communication interface based on the generation of the message, the message on a control channel or a signaling channel for receipt by one or more user devices attached to the network device in the cell area or the sector area;
    detect, subsequent to the transmission, that the network device is no longer in the congested state; and
    omit, in response to the detection that the network device is no longer in the congested state, to retransmit the message and omit to transmit any other message, via the control channel or the signaling channel, indicating that the network device is in a lesser degree of congestion relative to the congested state.

10. The system of claim 9 further comprising:
the user device, wherein the user device comprises:
a first communication interface of a first communicative standard pertaining to the first network, wherein the first network includes a Long Term Evolution network;
a second communication interface of a second communicative standard pertaining to a second network, wherein the first communicative standard is different from the second communicative standard;
a second memory, wherein the second memory stores second instructions; and
a second processor, wherein the second processor executes the second instructions to:
    receive an indication to initiate a session with another device via the network device of the first network, wherein the user device is a multimode device that can use, via the first communication interface, the first network of a first communicative standard and use, via a second communication interface, a second network of a second communicative standard that is different from the first communicative standard;
    receive, via the first communication interface, the message on the control channel or the signaling channel;
    determine whether the network device is in the congested state based on a receipt of the message; and
    invoke a switchover, wherein the switchover includes establishing a same session via the second communication interface and another network device of the second network, in response to a determination that the network device of the first network is in the congested state.

11. The system of claim 10, wherein the session and the same session are one of a voice session, a data session, a web session, or a streaming session.

12. The system of claim 9, wherein the network device is one of a base station, a Node B, an evolved Node B, a microcell wireless node, a picocell wireless node, or a femtocell wireless node.

13. The system of claim 9, wherein the first network is a Long Term Evolution (LTE) network, and wherein the message includes a system information block message that includes a service-specific access class (SSAC) barring parameter.

14. The system of claim 9, wherein the congested state is application-specific, and wherein, when transmitting, the first processor further executes the first instructions to:
    periodically transmit the message during a time period that the network device is in the congested state, wherein the message is broadcasted in the cell area or the sector area.

15. The system of claim 9, wherein the first processor further executes the first instructions to:
    perform, subsequent to the attachment, a session of the type of service with the user device, and wherein, when detecting, the first processor further executes the first instructions to:
    detect, during the performance, whether the network device is in the congested state.

16. A non-transitory storage medium storing instructions executable by a processor of a network device to:
    attach to a user device, wherein the network device provides wireless access coverage in a cell area or a sector area of a first network;
    detect, subsequent to the attachment, whether the network device is in a congested state, wherein the congested state is a state that prevents any access to a type of service in the cell area or the sector area, and wherein the instructions to detect comprise instructions to:
        evaluate current load measurements relative to available resources, wherein the load measurements are application-specific;
        generate a message that indicates that the network device is in the congested state based on a detection that the network device is in the congested state;
    transmit, based on the generation of the message, the message on a control channel or a signaling channel in the cell area of the sector area for receipt by one or more user devices attached to the network device in the cell area or the sector area;
    detect, subsequent to the transmission, that the network device is no longer in the congested state; and
    omit, in response to the detection that the network device is no longer in the congested state, to retransmit the message and omit to transmit any other message, via the control channel or the signaling channel, indicating that the network device is in a lesser degree of congestion relative to the congested state.

17. The non-transitory storage medium of claim 16, wherein the message includes a system information block message that includes a service-specific access class (SSAC) barring parameter.

18. The non-transitory storage medium of claim 16, further storing instructions executable by the processor of the network device to:
    periodically transmit the message during a time period that the network device is in the congested state, wherein the message is broadcasted in the cell area or the sector area.

19. The non-transitory storage medium of claim 16, wherein the first network is a Long Term Evolution network and the network device is an evolved Node B.

20. The non-transitory storage medium of claim 16, further storing instructions executable by the processor of the network device to:
- perform, subsequent to the attachment, a session of the type of service with the user device, and wherein the instructions to detect further comprise instructions executable by the processor of the network device to:
- detect, during the performance, whether the network device is in the congested state; and
- perform a handover with another wireless node of a second network and the user device based on the detection that the network device is in the congested state.

\* \* \* \* \*